No. 798,789. PATENTED SEPT. 5, 1905.
J. H. HENDRICKSON.
WATER EXTRACTING DEVICE.
APPLICATION FILED APR. 25, 1904.
4 SHEETS—SHEET 1.
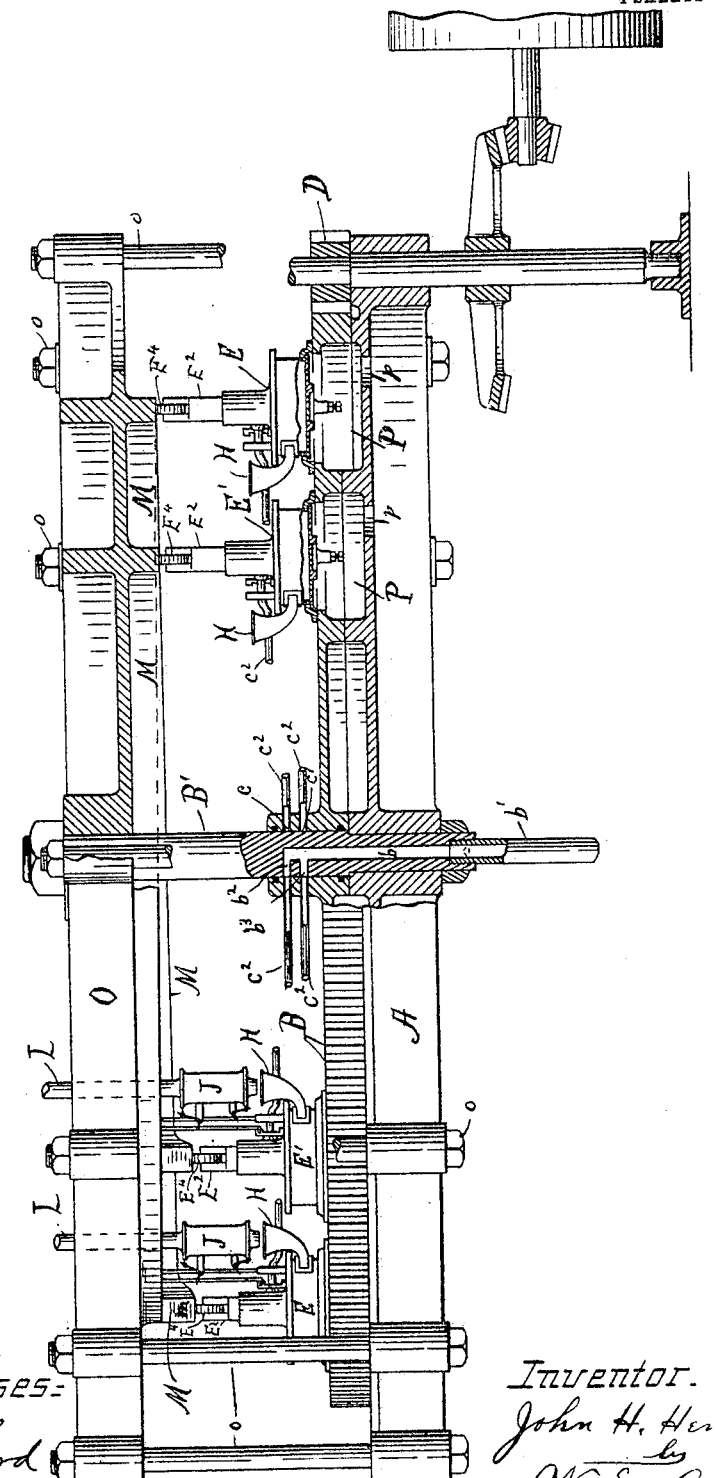
Witnesses:
A. L. Lord
E. B. Darnell
Inventor.
John H. Hendrickson
by W. E. Connelly
his Attorney.

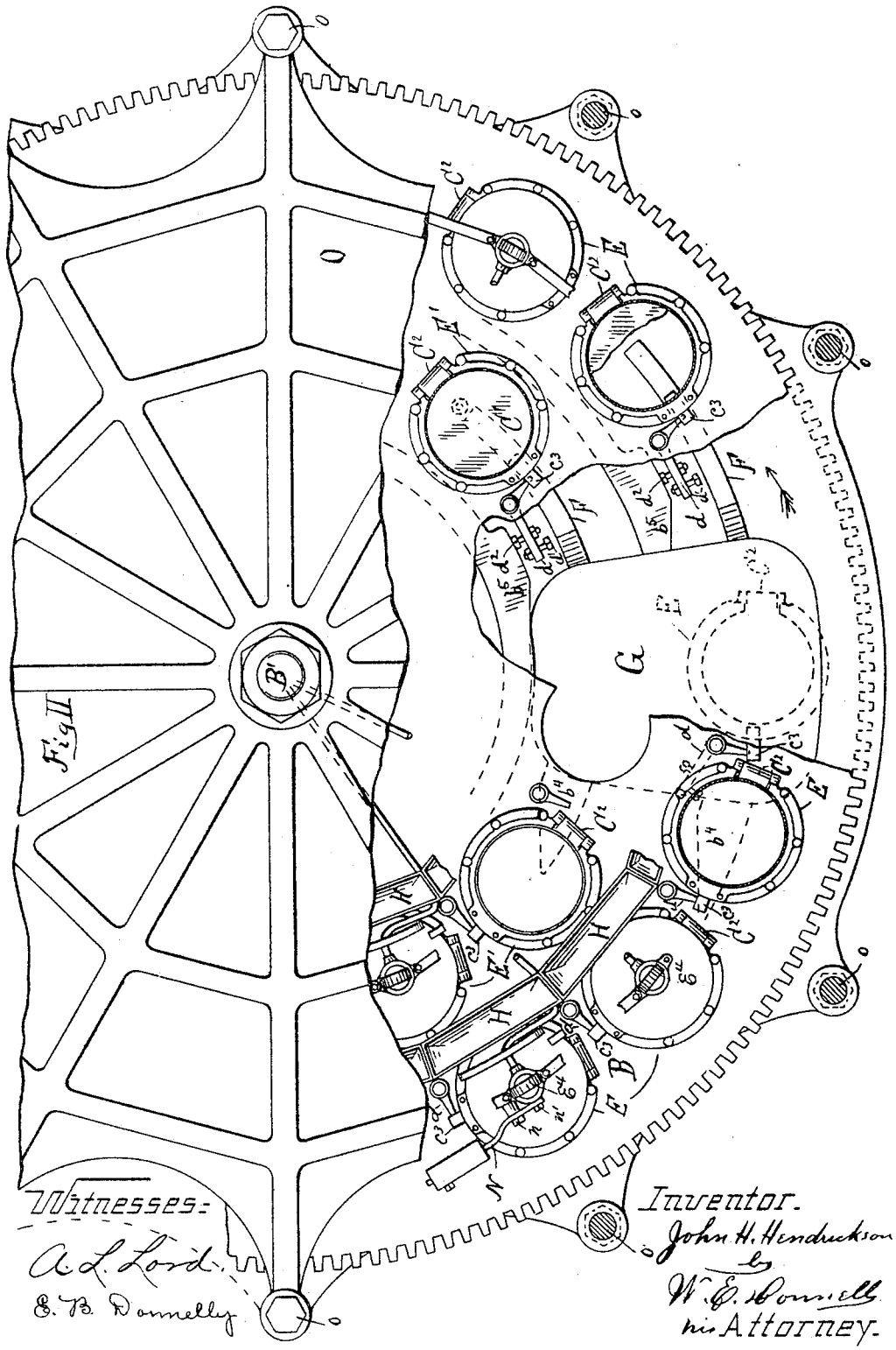

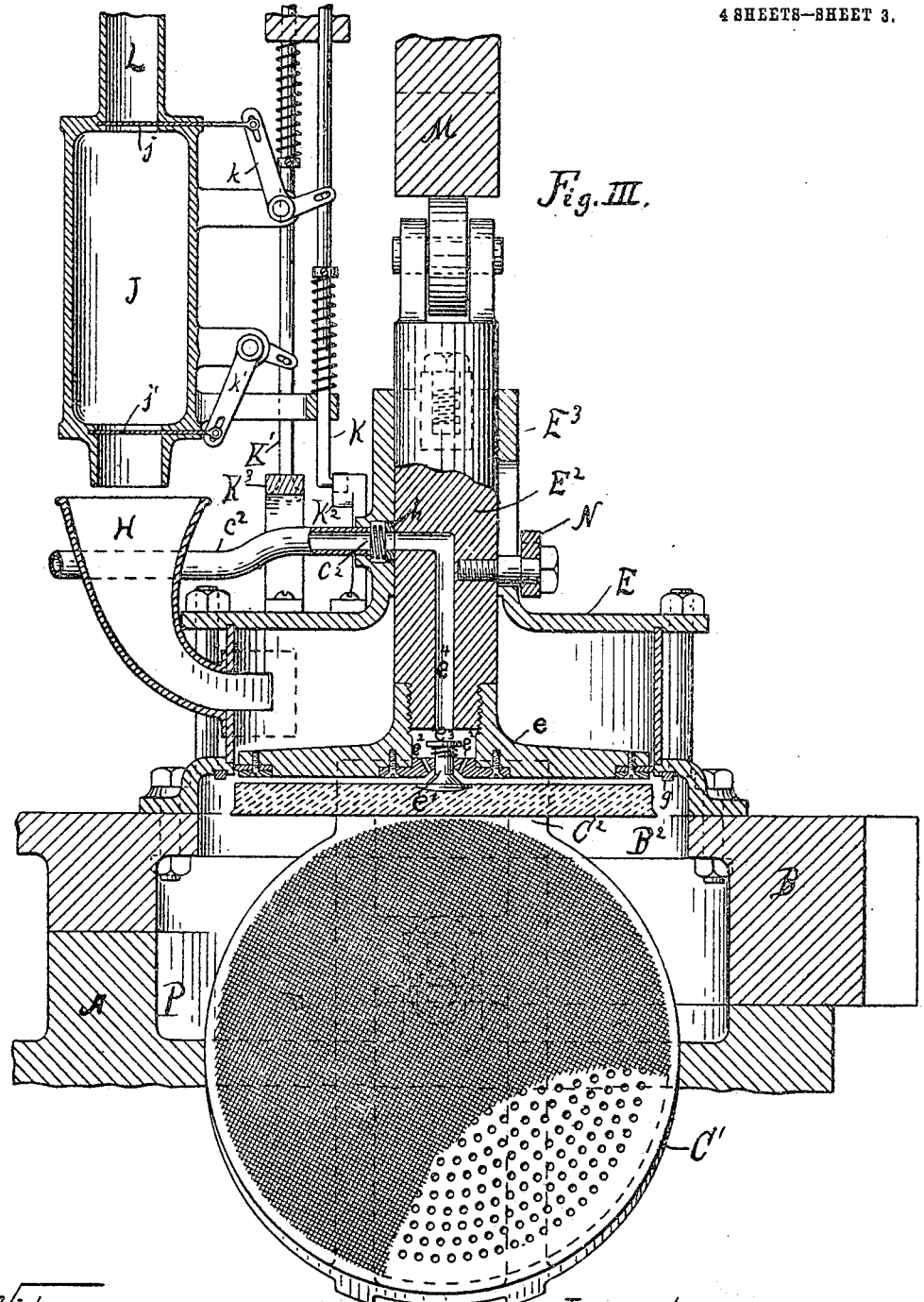

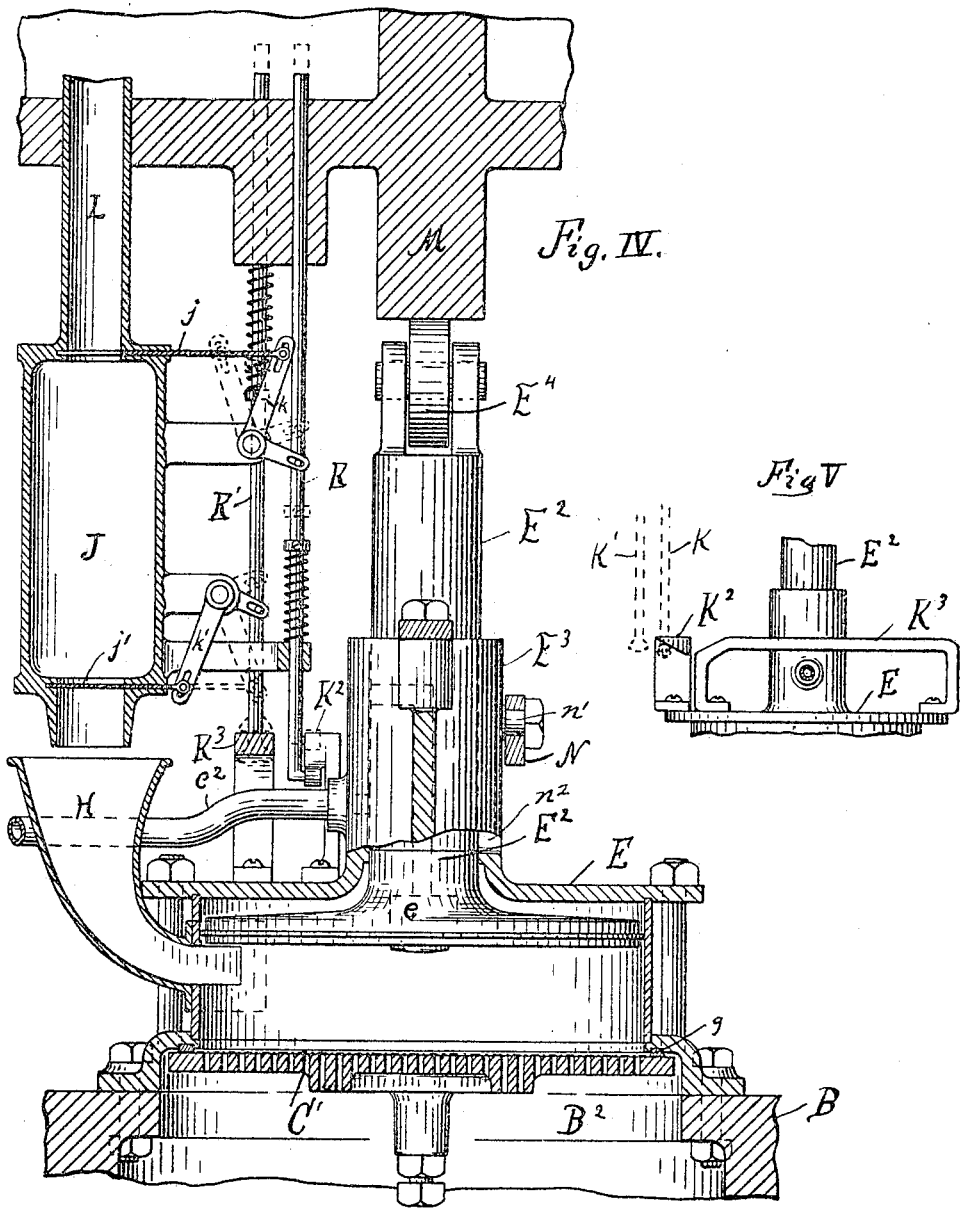

UNITED STATES PATENT OFFICE.

JOHN H. HENDRICKSON, OF CLEVELAND, OHIO.

WATER-EXTRACTING DEVICE.

No. 798,789.  Specification of Letters Patent.  Patented Sept. 5, 1905.

Application filed April 25, 1904. Serial No. 204,903.

*To all whom it may concern:*

Be it known that I, JOHN H. HENDRICKSON, a citizen of the United States, residing at Cleveland, in the county of Cuyahoga and State of Ohio, have invented certain new and useful Improvements in Water-Extracting Devices in the Manufacture of Cement; and I do hereby declare the following to be a full, clear, and exact description of the invention, such as will enable others skilled in the art to which it pertains to make and use the same.

My invention relates to the manufacture of cement, and more especially to that step in the process subsequent to the mixing and previous to the burning of the "slurry."

My invention has for its object the continuous operation of pressing the water or moisture from the slurry or mixture just previous to its delivery to the kilns and in delivering the pressed slurry to the kiln in cakes, having the water or moisture removed to a material extent therefrom, thus facilitating the burning process and resulting in a better product of cement.

My invention consists, first, in the continuous process of delivering the slurry to presses intermittently presented to means for delivering the slurry in predetermined quantities, extracting the water or moisture from the slurry by pressure, and delivering the pressed slurry in cakes ready to be burned in the kilns.

My invention consists, secondly, in the means coöperating to feed the slurry to intermittently-presenting water-extracting devices in predetermined quantities, to extract the water or moisture, to expel the cake of slurry after the water or moisture has been extracted, and to deliver the cake of slurry to a burning-kiln.

My invention also consists in the combination of parts and constructive features of the same, all of which will hereinafter be fully set forth and claimed.

In the drawings, Figure I is a view in elevation, partly in section, of a machine embodying my invention. This figure has some of the parts shown illustratively only, as they are too small in relation to the other features or parts to be shown clearly or in detail. Fig. II is a top plan view with a portion of the top removed and illustrating some of the press-chambers with their auxiliaries and some with the auxiliaries or parts of them removed for the sake of clearness. Fig. III is a view in detail and partly in section of one of the presses or water-extracting devices with its coöperating auxiliaries and illustrating the same with the bottom opened and the plunger at its lowest position forcing the slurry cake from the press-chamber. This figure also illustrates the feeding device and its operation and the air-forcing mechanism for loosening the cake from the bottom of the press-plunger. Fig. IV is a view in elevation and partly in section of the water-extracting press or device and its auxiliaries, illustrating the same with the plunger elevated and the press-chamber in position or condition to receive the wet or liquid slurry. Fig. V is a detail view illustrating the valve-operating cams of the feeding mechanism and their relative position in relation to each other.

Before proceeding with a detailed description of my invention as it is illustrated in the accompanying drawings I will explain that in the usual method of cement mixing and burning marl and clay is mixed with about from fifty to sixty per cent. of water and ground to a powder and then the mixture is stored in what is called a "storage" or "correction" tank, and this is called "slurry." From this storage or correction tank the slurry is pumped to the burning-kiln, and with its from fifty to sixty per cent. of water the mixture enters the kiln, and the moisture must be evaporated before drying and burning commences. Hence this process is tedious, limiting the output of the mill or factory. It is very desirable that the water be extracted from the slurry previous to its introduction to the kiln for the above obvious reasons; but it has been found very hard, if not impossible, to handle the slurry in its liquid form and in an economical and convenient manner and attain any substantial results.

By my invention I have eliminated all objections to handling of the liquid slurry and handle, deliver, press, and eject the slurry in almost, if not quite, solid cakes or lumps, and for this purpose I have herewith appended drawings illustrating means as I think them best adapted to carry out the process and which are as follows:

A represents a bed or base plate of the machine, which is supported in any suitable manner, either in standards or masonry, and is provided with suitable drainage. Surmounted on the bed or base A is a revoluble table B, centrally pivoted by means of a vertical spindle or shaft B'. The spindle or shaft B' is formed hollow, as at $b$, and is stationary and is also connected, by means of a tube $b'$, with an air-pressure. The shaft B' has outlets $b^2\ b^3$, which are adapted to register with pipe-openings $c\ c'$, leading to the several press-chambers and in the plungers thereof. (See Figs. I and III.) The function of the air-pressure is to loosen the pressed cake from the bottom of the plunger after the pressing operation is completed and the slurry cake is forced from the press-chamber, (see Fig. III,) as will be hereinafter more fully set forth.

The table B is provided with gear-teeth, which mesh with the teeth of a pinion D, in turn driven in any suitable manner so as to give to the table B a horizontal rotary movement in the desired direction. (See arrow, Fig. II.)

Mounted on the table B, so as to revolve therewith, are two series of annularly-arranged presses E E', each provided with a plunger $e$, connected to a stem $E^2$. The plunger $e$ is suitably packed and fits the press-cylinder snugly. Centrally located in the plunger $e$ is a valve $e'$, opening downwardly and held to its seat by a spring. The valves $e'$ control openings $e^2\ e^2$ of suitable number, leading downward from a chamber $e^3$. The chamber $e^3$ is in communication with a tubular channel $e^4$, passing through the plunger-stem $E^2$, said chamber communicating at stated times with pipes $c^2$, as will be hereinafter explained. (In III the communication is open and in Fig. IV it is closed.) In Fig. III the details of the press-feeding apparatus or mechanism, and also the air-pressure mechanism, is clearly set forth, and as their details are the same in all the series of presses I will describe them referring to this view, Fig. III.

The individual press-chambers are secured in two annular rows to the upper face of the table B in any suitable manner either by bolts, as illustrated, or other convenient fastenings. The press-chambers E E' are secured to the table B over openings $B^2$ and are provided with a downwardly-opening door C', which is hinged, as at $C^2$, to one side at the lower part of the chamber and is locked in position by a movable latch $c^3$, located opposite to the hinge portion. The latch $c^3$ is automatically opened and closed as the table B revolves and at predetermined times to allow the slurry cake to to be dropped or forced from the press and to close the door to adapt the press-chambers E E' to be filled and express the liquid from the slurry. The closing of the door C' is also automatically accomplished through suitable cams after the slurry cake has been discharged. The above arrangements and their operations are more clearly set forth in Fig. II and consist of bell-crank levers $d$, having their short arms engaging the sliding latch $c^3$ and their longer arms provided with adjustable projections $d'\ d^2$, adapted to engage, respectively, cams $b^4\ b^5$, the former for withdrawing the latch $c^3$ and allowing the door C' to drop and the latter for pushing the latch $c^3$ home and locking the door. A vertical cam F engages the bottom of the door C' and closes it after the discharge of the slurry cake, which is discharged through opening G in the bottom of the base A. (The dotted lines in Fig. II illustrate the latch just being withdrawn when the press-chamber is over opening G.) It is at this point that the discharge is made after the pressing is completed. The door C' of the press-chamber E constitutes the bottom of the press-chamber and is perforated and provided with a fine-mesh screen and, if necessary, a layer of canvas or cloth to retain the solid particles and allow the liquid to flow off as the slurry is pressed. (See Fig. III and Fig. IV for door construction.) A packing $g$ may be provided at the bottom of the press-chamber E, against which the door C' jams and forms a close joint.

The press-chamber feeding device or mechanism is composed of a hopper H, which is preferably formed at its upper end elongated, as illustrated in Fig. II, (to the left,) and at its lower end the hopper enters the chamber E about central of its height. Each press-chamber E E' is supplied with a hopper H, which moves with it and is so located that at a predetermined time—viz., just after the previously-pressed cake has been discharged or ejected—it will come under a valved charger J. The charger J is formed with a chamber of sufficient capacity to just charge the press-chamber with the right amount of slurry. The valves for operating the charging-chamber J are illustrated in Figs. III and IV. In Fig. III both valves are shown closed just previous to the charging operation of the press-chamber and just as they are as the pressed cake is being ejected. In Fig. IV the upper valve $j$ is shown open, and the lower valve $j'$ is closed just after charging the press-chamber and ready to receive the predetermined charge to charge the next press-chamber. The valves $j\ j'$ are operated by means of bell-crank levers $k\ k'$, which are in turn operated by spring-controlled and vertically-movable rods K K'. The lower ends of the rods K and K' are operated upon by cams $K^2$ and $K^3$, respectively, the former, $K^2$, operating the rod K and the latter, $K^3$, operating the rod K' and through it the bell-crank lever $k'$ and valve $j'$. The disposing of the cams $K^2$ and $K^3$ are shown in Fig. V, as is also their construction. The cam $K^2$ is formed shorter than the cam $K^3$ for the reason that the valve $j'$ is to be opened longer to allow the contents of the charging-chamber J to run into the press-chamber, and hence the hoppers are also elongated at their upper ends. The time in which the valve $j$ must be opened and closed is short, because the feed to chamber J is a force-feed, as the slurry is pumped through pipe L into it from the correction-tank. Each annular row of press-chambers is provided with a charger, and although I have shown and mentioned two annular rows it is evident that any convenient or suitable number may be employed, limited only by size of the machine.

The plunger $e$ is operated through the plunger-stem $E^2$, which operates within a casing $E^3$, surrounding the stem at the upper part of the press-chamber C, the stem $E^2$ working vertically through said casing $E^3$. At the upper end the stem $E^2$ is provided with a roller $E^1$, which engages an annular incline M, (see Fig. I,) and thus as the presses revolve the plungers are gradually depressed until the slurry is caked and ejected, (see Fig. III and to the left of Fig. I,) the plunger reaching the farthest projecting end of the incline M, as at $m$, Fig. I, and as the roller $E^1$ of each stem $E^2$ passes out of engagement with the farthest projecting or cam surface $m$ of the incline or track M the stem $E^2$ and plunger $e$ are again elevated by means of a weighted lever N, fulcrumed on a stud $n$ (see left of Fig. II) and connected to a pin or stud $n'$, carried by the stem $E^2$ and working in a slot $n^2$, provided therefor in the casing $E^3$. (See Fig. IV.) The lever N may be slotted for connection with the pin or stud $n'$ in order that the stem $E^2$ may move vertically. It is at this portion of the machine that the charger J is located and operates to charge the press-chambers.

As the plunger $e$ is depressed and as it has reached its lowest extent of movement (see Fig. III) the stem $E^2$ is in position to allow the channel-opening $e^4$ to communicate with the pipe-opening $e^5$, and thus air-pressure is admitted through the plunger-stem to the lower face of the plunger and between this lower face and the pressed cake. This forces the cake from the plunger and allows it to drop away when it otherwise might stick to the plunger, as it is more or less pasty. The construction of the valve $e'$ distributes the air into a radial sheet, clearing the bottom of the plunger. A spring-pressed valve-ring $h$ keeps the air from escaping when the plunger is raised.

The base A and the upper structure on top O of the machine are tied or braced together by tie-rods $o$ $o$ $o$ $o$, and the whole structure must necessarily be strong enough to bear the necessary strain of the pressing operation. The base A is provided with annular channels P P for the water to collect, and being inclined they may have outlets $p$ $p$ and suitable pipes (not shown) for carrying off the drainage.

The operation of my machine is as follows: Referring to Fig. IV, it will be imagined that the press has just been charged and the plunger $E^2$ is starting on its downward stroke. The press-chamber is meanwhile traveling a circular direction and the cam $K^2$ has engaged the rod K and opened the valve $j$. The liquid slurry is forced by pump-pressure, into the chamber J, filling it, and the valve closes, (the rod having passed the cam $K^2$.) This pressing-chamber passes round its path, and the plunger is meanwhile depressed until it reaches the point in Fig. I to the left of said figure. At this point the bottom or door $C'$ is released and drops, the press being over opening G in Fig. II. (See dotted lines.) Fig. III illustrates this action and position of the parts. As the door $C'$ opens the pressed slurry cake is ejected from the bottom of the chamber E and air forced between the bottom of the plunger $e$ and the upper surface of the cake, detaching the cake from the plunger, when it drops through opening G, Fig. II, into a suitable conveyer to be fed to the kiln. Any conveying means may be employed, and hence it is not thought necessary to illustrate one construction of the kind. After the chamber E has been emptied the door is closed by means of cam F coming in contact with it, and the latch $e^3$ is shifted with cam $b^5$ and the valve $j''$ contacted with cam $K^3$, and the valve $j''$ is opened and discharges the contents of chamber J into the hopper H and from thence into chamber E, and the operation as above is repeated with each succeeding press-chamber and in each annular row of chambers.

What I claim is—

1. A machine for extracting water from slurry previous to burning, comprising means for containing slurry, means for measuring the slurry into predetermined quantities comprising a valved charger, means for operating the valves of said charger to deliver the predetermined quantities to a water-extractor and means for discharging the portions from which the water has been extracted, all coöperating substantially as set forth.

2. In a machine of the type set forth, the combination with a valved charging-chamber, of a pressing-chamber, means communicating between the charging-chamber and pressing-chamber for delivering the slurry to the pressing-chamber, with means for automatically charging and discharging the charging-chamber.

3. In a machine of the type set forth, the combination with a series of movable water-extractors, of a charger adapted to successively charge each water-extractor with a predetermined amount, and means comprising valves for recharging the charging-chamber, and discharging it, substantially as set forth.

4. A machine of the type set forth comprising a series of annularly-arranged presses to receive the slurry, a charging device located so as to successively charge each press with the slurry, means embodying valves for controlling the charging and discharging of the charging-chamber, and communicating means between the charger and press-chamber coöperating, substantially as set forth.

5. A machine for extracting water from slurry, comprising continuously-movable water-extractors having hinged bottoms, means for successively charging said extractors with wet slurry in predetermined quantities, means for automatically releasing the bottoms, and means for automatically forcing the material from the extractors after the water has been extracted therefrom.

6. A machine of the type set forth, comprising successively-arranged press-chambers, and movable in relation to a charging device; a charging device for successively charging the press-chambers, plungers operating in the press-chambers, and an air-passage through each plunger to deliver air at the bottom of the plunger when the pressing operation is completed.

7. In a machine of the type set forth, the combination, with a series of successively-arranged circular-moving water-extractors, comprising press-chambers and plungers operating therein, of an annular incline arranged to depress the plungers as the water-extractors are moved in their circular path, and means for elevating the plungers after each depression thereof.

8. In a machine of the type set forth, a series of circular-moving presses including plungers, and means for delivering compressed air to the under surface of the plungers when the pressing operation is completed.

9. In a machine of the type set forth, a series of circular-moving presses including plungers, means for delivering compressed air to the under surface of the plungers when the pressing operation is completed, and means for shutting off the air-supply during the pressing operation of the plungers.

10. A machine of the type set forth, comprising a series of successively-arranged water-extractors embodying press-chambers and plungers operating therein, means for successively supplying the press-chambers with predetermined quantities of slurry, means for depressing the plungers to compress the slurry in the press-chambers, means for supplying air to the under surface of the plungers when the pressing operation is completed, and means for shutting off the air during the pressing operation.

11. In a machine of the type set forth, a water-extractor embodying a press-chamber and a plunger operating therein, means for supplying the chamber with slurry, a hinged bottom for said chamber, means for automatically opening said bottom to permit the discharge of compressed material from the chamber, and means for automatically closing the bottom after the discharge of the compressed material from the chamber.

12. In a machine for extracting water from slurry, a press-chamber and means for charging the same with slurry, in combination with a plunger operating in the chamber and having an air-port for admitting air to the under surface of the plunger on the completion of the pressing operation, and means for closing said port during the pressing operation.

13. In a machine for extracting water from slurry, a movable press-chamber, a plunger operating therein to compress the material, and means for depressing the plunger to compress the material, combined with a charger for delivering predetermined quantities of slurry to the press-chamber, and having automatically-operated valves successively operated, one to discharge the slurry from the charger to the press-chamber and the other to permit the recharging of the charger, substantially as described.

14. In a machine for extracting water from slurry, a water-extractor embodying a press-chamber, and a plunger operating therein, a hinged bottom for said press-chamber, means for automatically opening said bottom when the water-extracting operation is completed, means for automatically forcing the material from the extractors after the water has been extracted therefrom, means for automatically closing the bottom, when the material has been discharged from the extractor, and means for automatically supplying slurry to the extractor in predetermined quantities.

Signed at Cleveland, in the county of Cuyahoga and State of Ohio, this 4th day of April, 1904.

JOHN H. HENDRICKSON.

Witnesses:
A. L. LORD,
E. B. DONNELLEY.